(No Model.)

J. T. MURRAY.
LAMP WICK.

No. 519,795.  Patented May 15, 1894.

Witnesses
J. B. McGirr.
A. L. Harman.

Joseph T. Murray
Inventor
by Connolly Bros.
Attorneys

UNITED STATES PATENT OFFICE.

JOSEPH T. MURRAY, OF NEW YORK, N. Y.

LAMP-WICK.

SPECIFICATION forming part of Letters Patent No. 519,795, dated May 15, 1894.

Application filed September 9, 1891. Renewed August 24, 1892. Again renewed March 20, 1893, and again renewed October 16, 1893. Serial No. 488,328. (No specimens.)

*To all whom it may concern:*

Be it known that I, JOSEPH T. MURRAY, a citizen of the United States, residing at New York, in the county of New York and State of New York, have invented certain new and useful Improvements in Lamp-Wicks; and I do hereby declare the following to be a full, clear, and exact description of the invention, reference being had to the accompanying drawings, which form part of this specification.

My invention has relation to wicks for lamps, oil stoves, &c., and has for its object, the provision of an indestructible wick which shall possess all the advantageous qualities of the ordinary cotton or fiber wick, but which will last for an indefinite period without renewal or the necessity of trimming.

My invention consists in making a wick of burnt clay which is rendered capillary by incorporating with the clay, while in a plastic state, filaments of unspun vegetable fiber, which are burned out in the process of baking the clay, so as to leave the wick pierced or perforated longitudinally with minute orifices constituting capillary tubes through which the oil from the lamp will be raised to the flame by capillary attraction.

Figure 1:
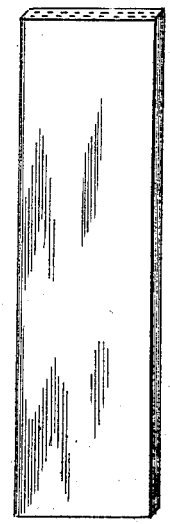
Figure 2:
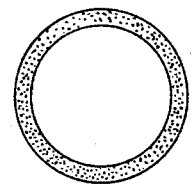

In the accompanying drawings Figure 1, is a representation in perspective of a wick made of burnt clay and rendered capillary according to my invention. Fig. 2, is a transverse sectional view of a circular or Argand wick, embodying my invention.

In carrying my invention into effect, I employ any suitable clay, such as kaolin or potter's clay, and previously to molding the same into shape, I incorporate therewith strands or filaments of unspun vegetable fiber, such as the natural filaments from ramie or cactus, the filaments being arranged lengthwise of, and within the body of the wick. After the clay is molded or pressed into shape it is baked in a kiln so as to harden the clay and consume or reduce the vegetable fiber filling, leaving the wick as a properly shaped mass of burnt clay having longitudinal capillary orifices.

I use vegetable fiber for the reason that the filaments of natural fiber are sufficiently firm to admit of being easily handled, and readily arranged, in the clay and leave but little ash, being almost totally consumed in the kiln.

Having described my invention, I claim—

1. A lamp wick made of burnt clay and rendered capillary by incorporating with the clay, while in a plastic state, filaments of unspun vegetable fiber which are burned out in the process of baking the clay.

2. The method of making indestructible lamp wicks which consists in incorporating with suitable clay, filaments of unspun vegetable fiber, molding the clay into the shape of a wick, and then baking the clay and burning out the filament, substantially as described.

In testimony that I claim the foregoing I have hereunto set my hand this 1st day of August, 1891.

J. T. MURRAY.

Witnesses:
ADAM GOS,
HUGH B. DUNLEAVY.